US009252859B2

(12) United States Patent
Moulsley et al.

(10) Patent No.: US 9,252,859 B2
(45) Date of Patent: *Feb. 2, 2016

(54) METHOD FOR SIGNALLING RESOURCES TO A RADIO STATION AND RADIO STATION THEREFOR

(71) Applicant: KONINKLIJKE PHILIPS N.V., Eindhoven (NL)

(72) Inventors: Timothy J. Moulsley, Caterham (GB); Matthew P. J. Baker, Canterbury (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,501

(22) Filed: Jan. 21, 2014

(65) Prior Publication Data
US 2014/0133384 A1 May 15, 2014

Related U.S. Application Data

(63) Continuation of application No. 12/989,659, filed as application No. PCT/IB2009/051639 on Apr. 21, 2009, now Pat. No. 8,665,769.

(30) Foreign Application Priority Data

Apr. 30, 2008 (EP) ..................................... 08305142

(51) Int. Cl.
*H04H 20/71* (2008.01)
*H04B 7/06* (2006.01)
*H04B 7/04* (2006.01)
*H04L 5/00* (2006.01)
*H04W 72/04* (2009.01)
*H04L 5/02* (2006.01)

(52) U.S. Cl.
CPC ............ *H04B 7/0608* (2013.01); *H04B 7/0452* (2013.01); *H04B 7/0617* (2013.01); *H04L 5/0053* (2013.01); *H04W 72/04* (2013.01); *H04L 5/023* (2013.01)

(58) Field of Classification Search
CPC ... H04L 5/0053; H04L 5/0023; H04L 5/0007; H04L 5/0091; H04L 5/0064; H04L 12/06; H04L 12/66; H04L 69/24; H04L 69/08; H04W 72/005; H04W 72/04; H04W 72/042; H04W 4/06
USPC .......................... 370/312, 328–330, 335–348; 375/260–267, 135–136, 146–147
See application file for complete search history.

(56) References Cited

U.S. PATENT DOCUMENTS 6,944,881 B1    9/2005  Vogel
7,882,233 B2    2/2011  Epstein et al.
(Continued)

FOREIGN PATENT DOCUMENTS

EP            1737176 A1 * 12/2006

*Primary Examiner* — Thai Hoang

(57) ABSTRACT

The present invention relates to a method for signaling a plurality of transmission parameters for a plurality of communications between a primary station and a plurality of respective secondary stations in a multi-user MIMO mode, comprising the steps of (a) signaling the value of at least one first transmission parameter in a multicast message to at least two secondary stations, the value of the first transmission parameter being common to the respective communications corresponding to the at least two secondary stations, and (b) signaling the value of at least one second transmission parameter in a plurality of unicast messages to each secondary stations of the plurality of secondary stations.

34 Claims, 1 Drawing Sheet

(56) References Cited

U.S. PATENT DOCUMENTS

| | | |
|---|---|---|
| 8,400,976 B2 | 3/2013 | Zhang et al. |
| 2004/0179627 A1* | 9/2004 | Ketchum et al. .............. 375/267 |
| 2007/0189289 A1* | 8/2007 | Frederiksen et al. ......... 370/390 |
| 2007/0268900 A1 | 11/2007 | Park et al. |
| 2008/0101269 A1 | 5/2008 | Jung et al. |
| 2011/0149824 A1* | 6/2011 | Tong et al. .................... 370/312 |

* cited by examiner

METHOD FOR SIGNALLING RESOURCES TO A RADIO STATION AND RADIO STATION THEREFOR

This application claims the benefit or priority of and describes relationships between the following applications: wherein this application is a continuation of U.S. patent application Ser. No. 12/989,659, filed Oct. 26, 2010, which is the National Stage of International Application No. PCT/IB2009/051639, filed Apr. 21, 2009, which claims the priority of foreign application 08305142.5 filed Apr. 30, 2008, all of which are incorporated herein in whole by reference.

The present invention relates to a method for signalling resources from a primary station to a plurality of secondary stations. This invention is, for example, relevant for any networks comprising a plurality of radio stations, and more specifically, to a mobile telecommunication network where the secondary stations are for instance able to carry out MIMO transmissions.

In a network like a mobile telecommunication network, a primary station (like a base station in GSM or an eNode B in UMTS) indicates the transmission resources allocated to the secondary stations (like mobile stations in GSM or User Equipments in UMTS).

For instance, in current versions of the specifications for the UMTS LTE (Long Term Evolution), signalling is provided on a control channel (like the PDCCH, Physical Downlink Control Channel) transmitted from the primary station (eNB) to the secondary station (UE) to indicate the transmission resources used for data transmission between the eNB and UE.

For downlink data transmissions, each such control signalling message may typically include at least some or all of the following: Time-frequency resource allocation, Number of MIMO layers used (i.e. the number of MIMO transmission beams), Hybrid ARQ process number, Modulation and Coding Scheme (MCS) for each layer, New data indicator (NDI) for each layer, Redundancy version (RV) for each layer, Precoding information for each layer, UE identity, CRC. Usually one control signalling message is transmitted per UE per subframe.

However, for several types of transmission modes, like a Multi User Multiple Input Multiple Output (MU-MIMO) transmission mode for example, where data transmissions to a set of UEs take place in the same (or at least overlapping) time-frequency resources, the amount of overhead arising from the control signalling may therefore become large.

It is an object of the invention to propose a method for signaling the allocation of resources in an efficient manner.

It is another object of the invention to propose a method for signaling of allocation of resources reducing the interference and the overhead.

Another more specific object of one of the embodiments of the present invention is to reduce the signalling overhead for MU-MIMO systems.

To this end, according to a first aspect of the invention, a method is proposed for signaling a plurality of transmission parameters for a plurality of communications between a primary station and a plurality of respective secondary stations, comprising the steps of (a) signaling the value of at least one first transmission parameter in a multicast message to at least two secondary stations, the value of the first transmission parameter being common to the respective communications corresponding to the at least two secondary stations, and (b) signaling the value of at least one second transmission parameter in a plurality of unicast messages to each secondary station of the plurality of secondary stations.

According to another aspect of the invention, a primary station is proposed comprising means for signaling a plurality of transmission parameters for a plurality of communications between the primary station and a plurality of respective secondary stations, comprising means for signaling the value of at least one first transmission parameter in a multicast message to at least two secondary stations, the value of the first transmission parameter being common to the respective communications corresponding to the at least two secondary stations, and means for signaling the value of at least one second transmission parameter in a plurality of unicast messages to each secondary station of the plurality of secondary stations.

According to still another aspect of the invention, a secondary station is proposed comprising means for receiving signaling messages related to a plurality of transmission parameters for a plurality of communications between a primary station and a plurality of secondary stations, further comprising means for deriving the transmission parameters from a multicast message signaling the value of at least one first transmission parameter, the value of the first transmission parameter being common to the respective communications corresponding to the secondary station and at least one further secondary station, and from a unicast message signaling the value of at least one second transmission parameter.

As a consequence, all the transmission parameters and control information which are common to a plurality of secondary stations may be sent in a single multicast message. A second message can be addressed respectively to each station for completing the information of the first message.

These and other aspects of the invention will be apparent from and will be elucidated with reference to the embodiments described hereinafter.

The present invention will now be described in more detail, by way of example, with reference to the accompanying drawings, wherein.

Figure 1:
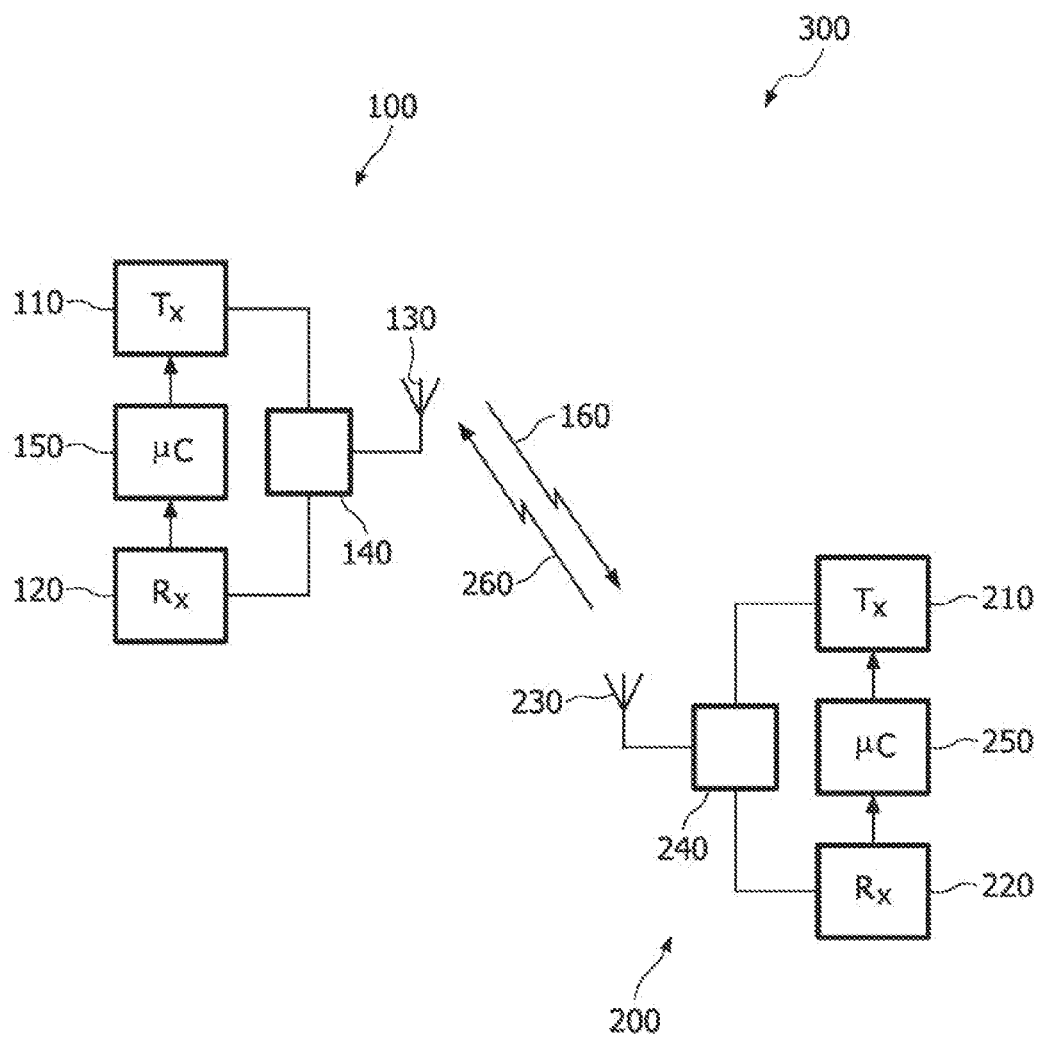
FIG. 1 is a block diagram of a system of communication in which the first aspect of the invention is implemented.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to for example an antenna array 130 comprising a plurality of antennas by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled for example to an antenna array 230 comprising a plurality of antennas by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the primary station 100 takes place on a second channel 260.

A first embodiment of the invention is based on the recognition that in some implementations of MU-MIMO, restrictions may be applied which result in some components of the control signalling information being common to multiple secondary stations.

Therefore, according to the invention, when multiple secondary stations receive data transmissions in the same time-frequency resources, i.e. when MU-MIMO is used, the corresponding control signalling is split into a multicast part and a plurality of unicast parts. Control signalling information which is common to all the secondary stations receiving data transmissions in a given time-frequency resource is transmitted in the multicast part, while control signalling information which is specific to an individual secondary station is transmitted in one of the unicast parts.

In one embodiment, a restriction may be applied such that for a set of secondary stations receiving data in a given time-frequency resource in a given subframe, the exact extent of the time-frequency resources used is identical for all the secondary stations in the set in the subframe. Such a restriction has the advantage that the intra-cell interference experienced by each secondary station as a result of the simultaneous transmissions to other secondary stations could be assumed to be the same for all the data received in that subframe. Moreover, this can reduce the complexity of channel estimation and decoding.

Under the scenario of such a restriction, according to the first embodiment of the invention, the time-frequency resource allocation is signalled in the multicast part of the control signalling and the remaining information is signalled in the unicast parts. In this example, the time-frequency resource comprises a frequency and a timeslot within a larger time frame. In one example of this embodiment, the multicast part comprises a broadcast identity and a set of time-frequency resource allocations, each time-frequency resource allocation corresponding to one set of secondary stations and being associated with an index. The time frequency resource allocation comprises the specification of the subcarriers, and the time slots. Then, the respective unicast parts then contain only the index pointing to one time-frequency allocation allocated to a secondary station. An advantage is that the index requires a much smaller number of signalling bits than the full signalling of the time-frequency resource allocation. Thus, if the time-frequency resource allocations signaled in the multicast message are reused for several time slots and updated only from time to time, this permits the amount of signaling required to allocate a resource to a secondary station to be significantly reduced.

Figure 2:
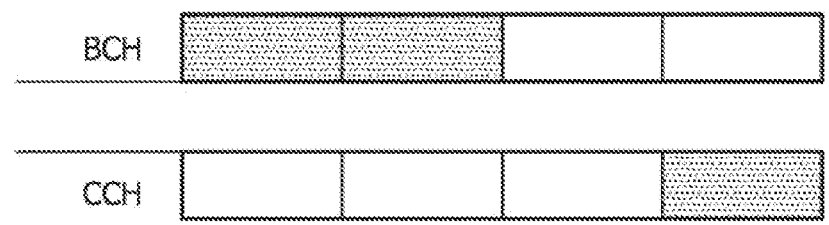
FIG. 2 is a time chart illustrating a method in accordance with the invention.

This is for instance illustrated in FIG. 2, where on a Broadcast Channel (BCH) which can be received by all the secondary stations, a time-frequency resource allocation is specified in one large message. Then, for instance on another channel, here the control channel (CCH), an index is specified to one particular secondary station, this index being representative of one set of allocation specified in the first broadcast message. In this example the two channels are different, but in a variant of this example, the message addressed to several secondary stations is a multicast message on the same control channel. In some embodiments multiple sets of secondary stations may receive transmissions in the same timeslot, with all the secondary stations in each set using a frequency resource allocation designated for that set. In such a case, the large message may comprise an indication of the same number of frequency resource allocations as secondary stations receiving transmissions in the same timeslot, each frequency resource allocation being associated with an index.

In another embodiment, part of the precoding information for each time-frequency resource allocation is indicated in the multicast part of the control signalling. The remainder of the precoding information for each secondary station is indicated in the corresponding unicast part. For example, the precoding vectors used for the transmission of data to the secondary stations in a set may be drawn from a particular matrix in a codebook, or from a predefined subset of vectors in the codebook. An indicator of the matrix or subset of vectors is then transmitted in the multicast part to the set of secondary stations, while the identity of the specific vector for each secondary station is transmitted in the corresponding unicast part, which is then sent to the secondary station.

In another embodiment of the invention, in a MU-MIMO system, the primary station transmits in a multicast message the time-frequency allocation which is common to a set of secondary stations, i.e. the time frequency block they will use for a MIMO transmission. Then, in a unicast message, the primary station specifies to each secondary station a precoding vector to be used, with which it is possible to direct the MIMO transmission beam towards the primary station.

In some embodiments, the multicast part of the control signalling is transmitted on a broadcast channel, and all the secondary stations can listen and receive this message. In other embodiments, the multicast part is transmitted with a multicast ID, monitored by a plurality of secondary stations, on the same control channel as the unicast parts. A multicast ID may be an ID referring to a group of particular secondary stations. Then, if a secondary station receives a message containing the multicast ID, it will check whether this ID corresponds to one group to whom the considered secondary station belongs. In other embodiments, the multicast part is transmitted with multiple UE IDs on the same control channel as the unicast parts.

This invention applies for instance to Multi-user MIMO mobile communication systems, such as LTE, LTE-Advanced, WiMAX or UMB.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfil the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:
1. A primary station comprising:
a plurality of antennas configured to transmit signals to a plurality of secondary stations in multicast or unicast multi-user MIMO modes;
a transmitter configured to signal messages to a plurality of secondary stations through the plurality of antennas;

a controller configured to control the transmitter, and to:
signal via a transmitter and a first set of at least one antenna of a plurality of antennas, operating in a multicast mode, an indication of a value of at least one first transmission parameter in a multicast message addressed to at least a first and a second secondary station, the value of the first transmission parameter being for common use for respective communications by both of the first and second secondary stations,
signal via the transmitter and a second set of multiple antennas of the plurality of antennas, operating in a unicast multi-user MIMO mode, an indication of a value of at least one second transmission parameter in a unicast message of a plurality of unicast messages to respective first and second secondary stations of the plurality of secondary stations, wherein the signaling of at least two of the unicast messages to different respective secondary stations occurs at least partly mutually overlap in time and frequency,
wherein the indication of the value of the at least one first transmission parameter in the multicast message, and the indication of the value of the at least one second transmission parameter in the unicast message are adapted to be combined for computing transmission parameters; and
wherein the indication of value of the at least one second transmission parameter provided in the unicast message provided only to the first secondary station is a parameter of the set of signaled transmission parameters for communications between the primary station and the first secondary station.

2. The primary station of claim 1, wherein the at least one first transmission parameter comprises at least one of a group of: a time slot and a frequency sub-band.

3. The primary station of claim 1, wherein the at least one second transmission parameter value comprises an indication of the respective beam of the MIMO transmission.

4. The primary station of claim 1, wherein the at least one first transmission parameter value comprises the number of beams of the MIMO transmission.

5. The primary station of claim 1, wherein at step (a), the indication of the at least one first transmission parameter value comprises an indication of a subset of beams for the MIMO transmissions, said subset being selected from a larger set of available beams, and the indication of the at least one second transmission parameter value comprises an indication of a selected beam from the indicated subset of beams.

6. The primary station of claim 5, wherein the at least one first transmission parameter value comprises a resource allocation and an association with an index and wherein at least one second transmission parameter value comprises the index.

7. The primary station of claim 5, wherein the at least one second transmission parameter value comprises at least one of the group of: a modulation and coding scheme, a precoding information, and an ARQ process number.

8. The primary station of claim 1, wherein the at least one first transmission parameter value comprises a set of precoding vectors each vector being associated with a respective index and wherein the at least one second transmission parameter value comprises the index.

9. The primary station of claim 1, comprising transmitting data to the plurality of secondary stations in accordance with the transmission parameter values.

10. The primary station of claim 1, comprising addressing the multicast message by means of a common identity associated with the at least two secondary stations.

11. A secondary station, comprising:
at least one antenna configured to receive signals from a primary station in unicast or multicast MIMO modes;
a receiver configured to receive messages from a primary station through the at least one antenna; and
a controller configured to control the receiver to receive messages from the primary station through the at least one antenna and receiver, and to:
receive via the at least one antenna and receiver, from the primary station operating in a multicast mode, a multicast message indicating a value of at least one first transmission parameter and addressed to the secondary station and at least one further secondary station, the value of the first transmission parameter being for common use for respective subsequent communications by both of the secondary station and the at least one further secondary station,
receive via the at least one antenna and receiver, from the primary station operating in a unicast multi-user MIMO mode, a unicast message addressed to the secondary station and indicating a value of a second transmission parameter wherein the reception by the secondary station of the unicast message at least partly overlaps in time and frequency with the presence of a further unicast message addressed to the at least one further secondary station;
when the last remaining message is received, of the messages containing the indicators of the values needed to compute the transmission parameters, then compute by the controller, the transmission parameters from both:
the value of the first transmission parameter in the multicast message; and
the value of the second transmission parameter in the unicast message; and
wherein the last remaining transmission parameter is a remaining parameter of the set of signaled transmission parameters for communications between the primary station and the first secondary station.

12. The secondary station of claim 11, wherein the at least one first transmission parameter comprises at least one of a group of: a time slot, and a frequency sub-band.

13. The secondary station of claim 11, wherein, the indication of the at least one second transmission parameter value comprises an indication of the respective beam of the MIMO transmission.

14. The secondary station of claim 11, wherein, the at least one first transmission parameter value comprises the number of beams of the MIMO transmission.

15. The secondary station of claim 11, wherein, the indication of the at least one first transmission parameter value comprises an indication of a subset of beams for the MIMO transmissions, said subset being selected from a larger set of available beams, and the indication of at least one second transmission parameter value comprises an indication of a selected beam from the indicated subset of beams.

16. The secondary station of claim 11, wherein the at least one first transmission parameter value comprises a resource allocation and an association with an index and wherein each at least one second transmission parameter value comprises the index.

17. The secondary station of claim 11, wherein the at least one second transmission parameter value comprises at least one of the group of: a modulation and coding scheme, a precoding information, and an ARQ process number.

18. The secondary station of claim 11, wherein the at least one first transmission parameter value comprises a set of precoding vectors each vector being associated with a respective index and wherein the at least one second transmission parameter value comprises the index.

19. The secondary station of claim 11, comprising a transmitter configured to transmit messages via the antenna, and the controller configured to transmit messages to the primary station in accordance with the transmission parameter values.

20. The secondary station of claim 11, wherein each of the plurality of secondary stations have multiple addresses including common addresses and the multicast message contains an address that is commonly associated with both the secondary station and the at least one further secondary station.

21. A method of operating a primary station for signaling a plurality of sets of signaled transmission parameters for a corresponding plurality of subsequent communications between the primary station and a plurality of secondary stations, the method comprising:
    in the primary station:
        signaling by a controller via a transmitter and a first set of at least one antenna of a plurality of antennas, operating in a multicast mode, an indication of the value of at least one first transmission parameter in a multicast message addressed to at least a first and a second secondary station, the value of the at least one first transmission parameter being for common use for respective communications by at least the first and second secondary stations, and
        signaling by a controller via the transmitter and a second set of multiple antennas of the plurality of antennas, operating in a unicast multi-user MIMO mode, an indication of the value of at least one second transmission parameter in a first unicast message of a plurality of unicast messages, addressed to only the first secondary station, and
    wherein the indication of the value of the at least one first transmission parameter in the multicast message, and the indication of the value of the at least one second transmission parameter in the unicast message are adapted to be combined for computing transmission parameters;
    wherein the at least one second transmission parameter provided in the first unicast message provided to the first secondary station is a parameter relating to communications between the primary station and the first secondary station, and the at least one second transmission parameter is a parameter of a set of signaled transmission parameters for communications between the primary station and the first secondary station, and
    wherein the first unicast message at least partially overlaps in time and frequency with at least one second unicast message transmitted from the primary station to the second secondary station.

22. The method of claim 21, wherein the indication of the at least one first transmission parameter value comprises the number beams of the MIMO transmission.

23. The method of claim 21, wherein the indication of the at least one second transmission parameter comprises an indication of the respective beam of the MIMO transmission.

24. The method of claim 21, wherein the indication of the at least one first transmission parameter value comprises an indication of at least one of: a time slot and a frequency sub-band.

25. The method of claim 21, wherein the indication of the at least one first transmission parameter value comprises an indication of a subset of beams for the unicast multi-user MIMO transmissions, the subset being selected from a larger set of available beams, and the indication of at least one second transmission parameter value comprises an indication of a selected beam from the indicated subset of beams.

26. The method of claim 21, wherein the indication of the at least one second transmission parameter value comprises an indication of a selected beam from the indicated subset of beams.

27. The method of claim 21, wherein the indication of the at least one first transmission parameter value comprises a resource allocation and an association with an index and wherein the indications of the at least one second transmission parameter values comprise the index.

28. The method of claim 21, wherein the at least one second transmission parameter comprises at least one of the group of: a modulation and coding scheme, a precoding information, an ARQ process number.

29. The method of claim 21, wherein the at least one first transmission parameter value comprises a set of precoding vectors associated with respective indexes and wherein the at least one second transmission parameter value comprises the index.

30. The method of claim 21, further comprising transmitting data to the least the first and second secondary stations in accordance with the transmission parameter values.

31. The method of claim 21, comprising addressing the multicast message by means of a common identity associated with the at least the first and second secondary stations.

32. A method of operating a first secondary station for receiving messages related to a plurality of sets of signaled transmission parameters for a plurality of subsequent communications between a primary station and a corresponding plurality of secondary stations, the method comprising:
    in a secondary station:
        receiving, by a controller via an antenna and a receiver, from the primary station operating in a multicast mode, a multicast message indicating the value of at least one first transmission parameter, addressed to the secondary station and at least one further secondary station, the value of the first transmission parameter being for common use for respective subsequent communications by both the secondary station and the at least one further secondary station,
        receiving by the controller via the antenna and the receiver, from the primary station operating in a unicast multi-user MIMO mode, a unicast message addressed to the secondary station and indicating the value of a second transmission parameter, wherein the reception of the unicast message at least partly overlaps in time and frequency with at least one further unicast message addressed to the at least one further secondary station, the address in the unicast message being different than the address of the further unicast message;
    wherein the at least one first transmission parameter is a parameter in the set of signaled transmission parameters for communications between the primary station and the secondary station, and the at least one second transmission parameter is a parameter of the set of signaled transmission parameters for communications between the primary station and the secondary station, and
    wherein the signaling of at least two of the unicast messages to different respective secondary stations occurs at least partly mutually overlap in time and frequency,
        when the last remaining message is received, of the messages containing the indicators of the values needed to compute the transmission parameters, then computing by the controller, the transmission parameters from both:
the value of the first transmission parameter in the multicast message; and
the value of the second transmission parameter in the unicast message.

33. A non-transitory computer-readable storage device that is not a transitory propagating signal or wave, having stored thereon instructions that when executed cause processing circuitry of a primary station to:
in the primary station:
signaling by a controller via a transmitter and a first set of at least one antenna of a plurality of antennas, operating in a multicast mode, an indication of the value of at least one first transmission parameter in a multicast message addressed to both of at least a first and second secondary station, the value of the at least one first transmission parameter being for common use for respective communications by both of the at least first and second secondary stations, and
signaling by the controller via the transmitter and a second set of multiple antennas of the plurality of antennas, operating in a unicast multi-user MIMO mode, an indication of the value of at least one second transmission parameter in a first unicast message of a plurality of unicast messages, addressed to only the first secondary station, and
wherein the indication of the value of the at least one first transmission parameter in the multicast message, and the indication of the value of the at least one second transmission parameter in the unicast message are adapted to be combined for computing transmission parameters;
wherein the at least one second transmission parameter provided in the first unicast message provided to the at least first secondary station is a parameter in the set of signaled transmission parameters relating to communications between the primary station and the first secondary station, and the last in time parameter to arrive of either the at least one first transmission parameter or the at least one second transmission parameter is a remaining parameter of the set of signaled transmission parameters for communications between the primary station and the first secondary station, and
wherein the first unicast message at least partially overlaps in time and frequency with at least one second unicast message transmitted from the primary station to the second secondary station.

34. A non-transitory computer readable storage device that is not a transitory propagating signal or wave, having stored thereon instructions that when executed cause processing circuitry of a secondary station to:
in the secondary station:
receive, by a controller via an antenna and a receiver, from a primary station operating in a multicast mode, a multicast message indicating the value of at least one first transmission parameter, addressed to the secondary station and at least one further secondary station, the value of the first transmission parameter being for common use for respective subsequent communications by both the secondary station and the at least one further secondary station,
receive by the controller via the antenna and the receiver, from the primary station operating in a unicast multi-user MIMO mode, a unicast message addressed to the secondary station and indicating the value of a second transmission parameter, wherein the reception of the unicast message at least partly overlaps in time and frequency with at least one further unicast message addressed to the at least one further secondary station, the address in the unicast message being different than the address of the further unicast message;
wherein the at least one first transmission parameter is a parameter in the set of signaled transmission parameters relating to communications between the primary station and the secondary station, and the last in time parameter to arrive of either the at least one first transmission parameter or the at least one second transmission parameter is a remaining parameter of the set of signaled transmission parameters relating to communications between the primary station and the secondary station, and
wherein the signaling of at least two of the unicast messages to different respective secondary stations occurs at least partly mutually overlap in time and frequency,
when the last remaining message is received, of the messages containing the indicators of the values needed to compute the transmission parameters, then computing by the controller, the transmission parameters from both:
the value of the first transmission parameter in the multicast message; and
the value of the second transmission parameter in the unicast message.

* * * * *